United States Patent
Bucknell et al.

(10) Patent No.: US 9,765,705 B2
(45) Date of Patent: Sep. 19, 2017

(54) TWO-STEP VALVETRAIN PREPOSITION CONTROL STRATEGY

(71) Applicants: John R Bucknell, Royal Oak, MI (US); Aymail Ismail, Westland, MI (US); Ethan E Bayer, Lake Orion, MI (US); Drushan Mavalankar, Rochester Hills, MI (US)

(72) Inventors: John R Bucknell, Royal Oak, MI (US); Aymail Ismail, Westland, MI (US); Ethan E Bayer, Lake Orion, MI (US); Drushan Mavalankar, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 121 days.

(21) Appl. No.: 14/950,275

(22) Filed: Nov. 24, 2015

(65) Prior Publication Data

US 2017/0145927 A1 May 25, 2017

(51) Int. Cl.
*F02D 13/02* (2006.01)
*F01L 1/22* (2006.01)

(52) U.S. Cl.
CPC ............ *F02D 13/02* (2013.01); *F01L 1/22* (2013.01); *F01L 2800/10* (2013.01); *F01L 2800/14* (2013.01); *F01L 2820/043* (2013.01)

(58) Field of Classification Search
CPC .. F02D 13/02; F02D 13/0203; F02D 13/0207; F02D 13/0226; F02D 13/023; F02D 2041/001; F02D 41/18; F01L 2800/10; F01L 1/34409; F01L 1/22

USPC ............. 123/436, 345–348, 568.19, 568.21; 701/103, 110, 108; 73/114.31, 114.32, 73/114.33, 114.74
See application file for complete search history.

(56) References Cited

U.S. PATENT DOCUMENTS

| | | | |
|---|---|---|---|
| 5,765,527 A | 6/1998 | Lehner et al. | |
| 6,736,105 B1 | 5/2004 | Kolmanovsky et al. | |
| 7,540,270 B2 * | 6/2009 | Kang | F02B 1/12 123/295 |
| 7,689,344 B2 * | 3/2010 | Kang | F02D 13/0203 123/295 |

(Continued)

OTHER PUBLICATIONS

International Search Report and Written Opinion dated Mar. 9, 2017 for International Application No. PCT/US2016/062670, International Filing Dated Nov. 18, 2016.

*Primary Examiner* — Hai Huynh
*Assistant Examiner* — Long T Tran
(74) *Attorney, Agent, or Firm* — Ralph E Smith

(57) ABSTRACT

A control technique for an engine having a two-step variable valve lift system includes a controller receiving a pressure in an intake manifold of the engine from a manifold absolute pressure (MAP) sensor and a position of an EGR valve of the engine from an exhaust gas recirculation (EGR) sensor. In response to the controller detecting an upcoming HL-to-LL valve state transition, a set of airflow actuators of the engine is controlled, based on the intake manifold pressure and the EGR valve position, to generate a first torque reserve. In response to generating the first torque reserve, the controller then commands the HL-to-LL transition and depletion of the first torque reserve during the HL-to-LL transition to mitigate torque disturbance associated with this transition.

18 Claims, 3 Drawing Sheets

(56) References Cited

U.S. PATENT DOCUMENTS

| | | | |
|---|---|---|---|
| 7,975,672 B2* | 7/2011 | Kang | F02D 13/0219 |
| | | | 123/321 |
| 8,056,516 B2 | 11/2011 | Cinpinski et al. | |
| 8,091,527 B1 | 1/2012 | Brown et al. | |
| 8,347,857 B2* | 1/2013 | Cleary | F02D 13/0207 |
| | | | 123/347 |
| 8,443,587 B2* | 5/2013 | Narayanaswamy | F01N 3/2013 |
| | | | 60/285 |
| 8,473,179 B2 | 6/2013 | Whitney et al. | |
| 2008/0302319 A1* | 12/2008 | Kang | F02D 13/0203 |
| | | | 123/90.15 |
| 2009/0229562 A1 | 9/2009 | Ramappan et al. | |
| 2009/0229564 A1 | 9/2009 | Kang et al. | |
| 2009/0234560 A1 | 9/2009 | Rayl et al. | |
| 2011/0192373 A1 | 8/2011 | Kang et al. | |
| 2011/0315101 A1* | 12/2011 | Cleary | F02D 13/0207 |
| | | | 123/90.15 |
| 2012/0035793 A1 | 2/2012 | Kang et al. | |
| 2012/0117011 A1 | 5/2012 | Hashimoto et al. | |
| 2013/0174815 A1* | 7/2013 | Cleary | F02D 41/3836 |
| | | | 123/557 |
| 2015/0275784 A1* | 10/2015 | Whitney | F02D 13/02 |
| | | | 701/102 |

* cited by examiner

TWO-STEP VALVETRAIN PREPOSITION CONTROL STRATEGY

FIELD

The present application generally relates to valvetrain control systems and, more particularly, to a two-step valvetrain preposition control strategy.

BACKGROUND

An engine having a two-step variable valve lift (VVL) system utilizes specifically configured rocker arms and tri-lobe intake camshafts to provide for valve lift and opening duration to be toggled between two modes: a default or low lift mode and a high lift mode. This VVL system allows the engine to effectively have both a performance mode (the high lift mode) and an efficiency mode (the low lift mode). Low valve lift provides for fuel economy increases by reducing engine pumping work, while high lift enables or provides for increased performance (e.g., increased power). Airflow-based actuators for engine torque (throttle) and intake air/exhaust mass fraction (exhaust gas recirculation (EGR) valve), however, produce a slower response compared to the valve lift transition, particularly from low-to-high lift. This can result in a torque disturbance (noise, vibration, and/or harshness), which may be felt by the driver. Accordingly, while such VVL systems work for their intended purpose, there remains a need for improvement in the relevant art.

SUMMARY

A control system and a method for an engine having a two-step variable valve lift (VVL) system are presented. A manifold absolute pressure (MAP) sensor is configured to measure a pressure in an intake manifold of the engine. An exhaust gas recirculation (EGR) sensor is configured to measure a position of an EGR valve of the engine. A controller is configured to detect an upcoming high lift to low lift (HL-to-LL) valve state transition and, in response to detecting the upcoming HL-to-LL valve state transition: based on the intake manifold pressure and the EGR valve position, control a set of airflow actuators of the engine to generate a first torque reserve, and in response to generating the first torque reserve, (i) command the HL-to-LL transition and (ii) deplete the first torque reserve during the HL-to-LL transition to mitigate torque disturbance associated with the HL-to-LL transition.

In some implementations, the set of airflow actuators include a throttle valve of the engine and the EGR valve. In some implementations, the set of airflow actuators further includes intake and exhaust camshaft phasers. In some implementations, depleting the torque reserve during the HL-to-LL valve state transition includes (i) commanding fuel and spark systems to low lift modes and (ii) actuating solenoids of the VVL system to low lift. In some implementations, detecting the HL-to-LL transition further comprises determining that dual-stage oil pump (DSOP) pressure is appropriate for performing the HL-to-LL valve state transition. In some implementations, the controller is configured to detect the upcoming HL-to-LL valve state transition based on a calculated volumetric efficiency (VE) of the engine.

In some implementations, the controller is further configured to detect an upcoming low lift to high lift (LL-to-HL) valve state transition and, in response to detecting the LL-to-HL valve state transition, control a set of ignition actuators to generate a second torque reserve. In some implementations, the controller is further configured to in response to generating the second torque reserve, (i) command the LL-to-HL transition and (ii) deplete the second torque reserve during the LL-to-HL transition. In some implementations, controlling the set of ignition actuators to generate the second torque reserve includes retarding spark timing.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As mentioned above, engine torque can vary between low lift and high lift states or modes of a valvetrain. If unaccounted for, this change in engine torque can cause noise, vibration, or harshness (NVH) that could be felt by the driver. Airflow-based actuators (throttle valve, exhaust gas recirculation (EGR) valve, etc.), however, produce too slow of a change in engine torque when positioned at the time of the valve lift state change. Accordingly, techniques are presented for propositioning the airflow-based actuators for engine torque (the throttle valve) and exhaust composition (the EGR valve) before an anticipated valve lift state change. This can also be described as building a torque reserve for the upcoming or anticipated valve lift state change. This torque reserve can then be depleted during the valve lift state change, thereby providing smooth torque across the valve lift state change and decreasing or eliminating the NVH. Further, by providing the appropriate amount of EGR across the valve lift state change, potential emissions increases are avoided.

Figure 1:
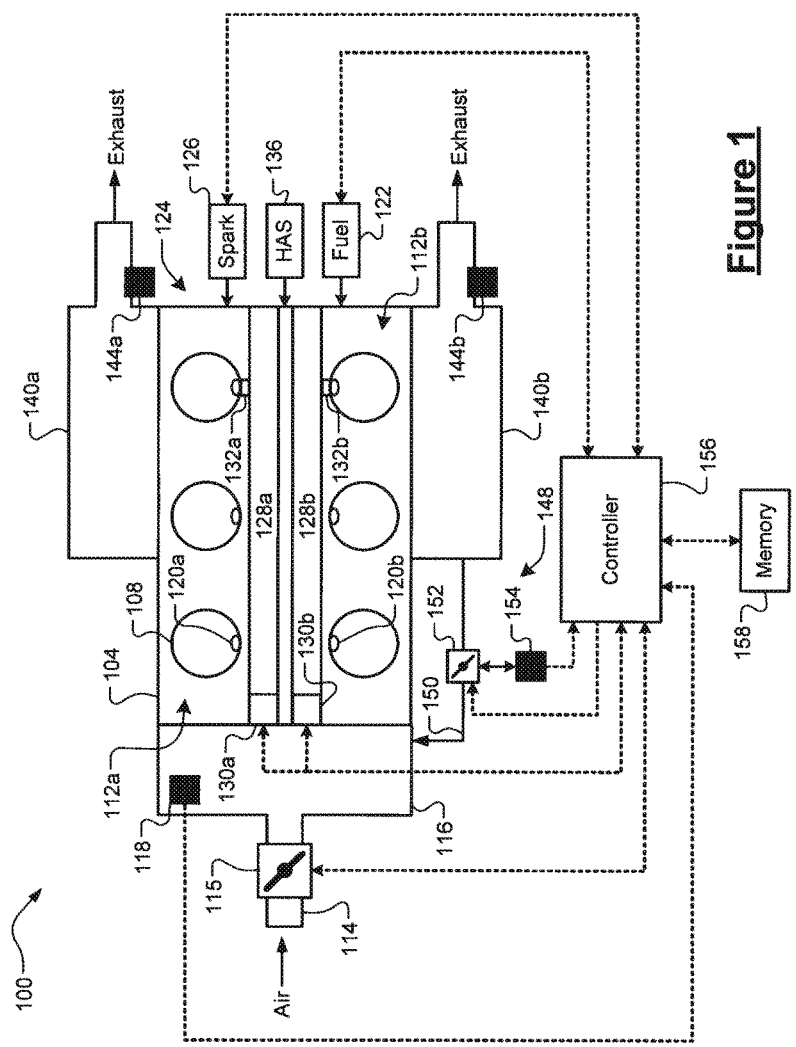
FIG. 1 is a diagram of an example engine system according to the principles of the present disclosure.

Referring now to FIG. 1, a diagram of an example engine system 100 is illustrated. The engine 104 is any suitable internal combustion engine having a plurality of cylinders 108. While a V-type engine 104 is illustrated and discussed herein, it will be appreciated that a non-V-type engine (e.g., an inline engine) could utilize the techniques of the present disclosure. The cylinders 108 are divided into two cylinder banks 112a and 112b (collectively "cylinder banks 112"). While six cylinders are shown, it will be appreciated that other even numbers of cylinders could be implemented (4, 8, 10, 12, etc.). In one exemplary implementation, the cylinder banks 112 are arranged at an angle with respect to each other. The engine 104 draws in air through an induction system 114 that is regulated by a throttle valve 115. An intake manifold absolute pressure (MAP) sensor 116 measures a pressure of an air mixture (e.g., air or air/exhaust) in an intake manifold 118 of the engine 104.

The air mixture in the intake manifold 118 is distributed to the cylinders 108 via respective intake valves 120a, 120b (collectively "intake valves 120") that are actuated by a VVL system 124 that includes energizable solenoids. In one exemplary implementation, the VVL system 124 is a two-step VVL system, as more fully described below. The air mixture is combined with fuel from a fuel system 122, compressed by pistons (not shown) within the cylinders 108, and ignited by spark from a spark or ignition system 126. Non-limiting example components of the fuel system 122 include a fuel tank, a fuel pump, a fuel rail, and fuel injectors and non-limiting example components of the ignition system 126 include ignition coils and spark plugs. The ignition (combustion) of the compressed air/fuel mixture drives the pistons, which generates drive torque at a crankshaft (not shown) of the engine 104. The drive torque is then transferred to a vehicle drivetrain (not shown) by a transmission (not shown).

For a two-step VVL system, intake camshafts 128a, 128b (collectively "intake camshafts 128") having multiple lobes (e.g., a tri-lobe configuration) actuates respective sets of rocker arms 132a, 132b (collectively "rocker arms 132"). In turn, the rocker arms 132 actuate the respective intake valves 120. Intake camshaft phasers 130a and 130b (collectively "intake camshaft phasers 130") are configured to adjust a rotational position of the respective intake camshafts 128. In a default or low lift mode, a hydraulic actuation system (HAS) 136 actuates the rocker arms 132 such that they are actuated by a subset of the respective lobes of the intake camshafts 128. In a high lift mode, the hydraulic actuation system 136, which includes a dual-stage oil pump (DSOP), controls the rocker arms 132 such that they are actuated by respective lobes of the intake camshafts 128, thereby providing an increased peak lift. In one exemplary implementation, the hydraulic actuation system 136 achieves this increased peak lift by pumping hydraulic fluid to the respective rocker arms 132 to actuate respective pins that alter the orientation of the respective rocker arms.

The engine 104 can also include one or more exhaust camshafts (not shown) configured to operate exhaust valves (not shown) of the cylinders 108 and one or more exhaust camshaft phasers (not shown) configured to control the rotational position of the respective exhaust camshafts. While not shown, the intake and exhaust camshaft phases could also have associated position sensors for measuring their respective positions. Exhaust gas resulting from combustion is expelled from the cylinders 108 into respective exhaust systems 140a and 140b (collectively "exhaust systems 140"), which treat the exhaust gas before releasing it to the atmosphere. Exhaust gas oxygen (O2) concentration sensors 144a and 144b (collectively "exhaust gas oxygen concentration sensors 144") are each configured to measure an oxygen concentration of the exhaust gas in their respective exhaust systems 140. Thus, cylinder bank 112a is associated with exhaust system 140a and sensor 144a, and cylinder bank 112b is associated with exhaust system 140b and sensor 144b. This is also commonly referred to as a dual exhaust system.

At least a portion of the exhaust gas could be recirculated into the induction system 114 or the intake manifold 118 via an exhaust gas recirculation (EGR) system 148. While a single EGR system 148 is illustrated, it will be appreciated that each exhaust system 140a, 140b could be associated with its own EGR system. The EGR system 148 includes an EGR line 150, an EGR valve 152 that regulates the recirculation of the exhaust gas, and an EGR valve position sensor 154. A controller 156 is configured to control the engine system 100, including performing at least a portion of these control techniques, which are more fully described below. In one exemplary implementation, the controller 156 includes one or more processors and is associated with a non-volatile memory 158, such as an electrically erasable programmable read-only memory (EEPROM).

The controller 156 is configured to detect an upcoming or anticipated valve lift state change. The two potential valve lift state changes are (1) low lift (LL) to high lift (HL), also referred to herein as a LL-to-HL state change, and (2) HL to LL, also referred to herein as a HL-to-LL state change. In one exemplary implementation, this transition is detected based on a volumetric efficiency (VE) of the engine 104 and/or a current load or torque demand on the engine 104. For example, the LL-to-HL state change could be performed when the VE is low and/or a large torque demand is present. In either scenario, the controller 156 is configured to generate a torque reserve before the upcoming transition, which is then depleted during the transition. The specifics of these techniques will now be discussed in greater detail.

Figure 2:
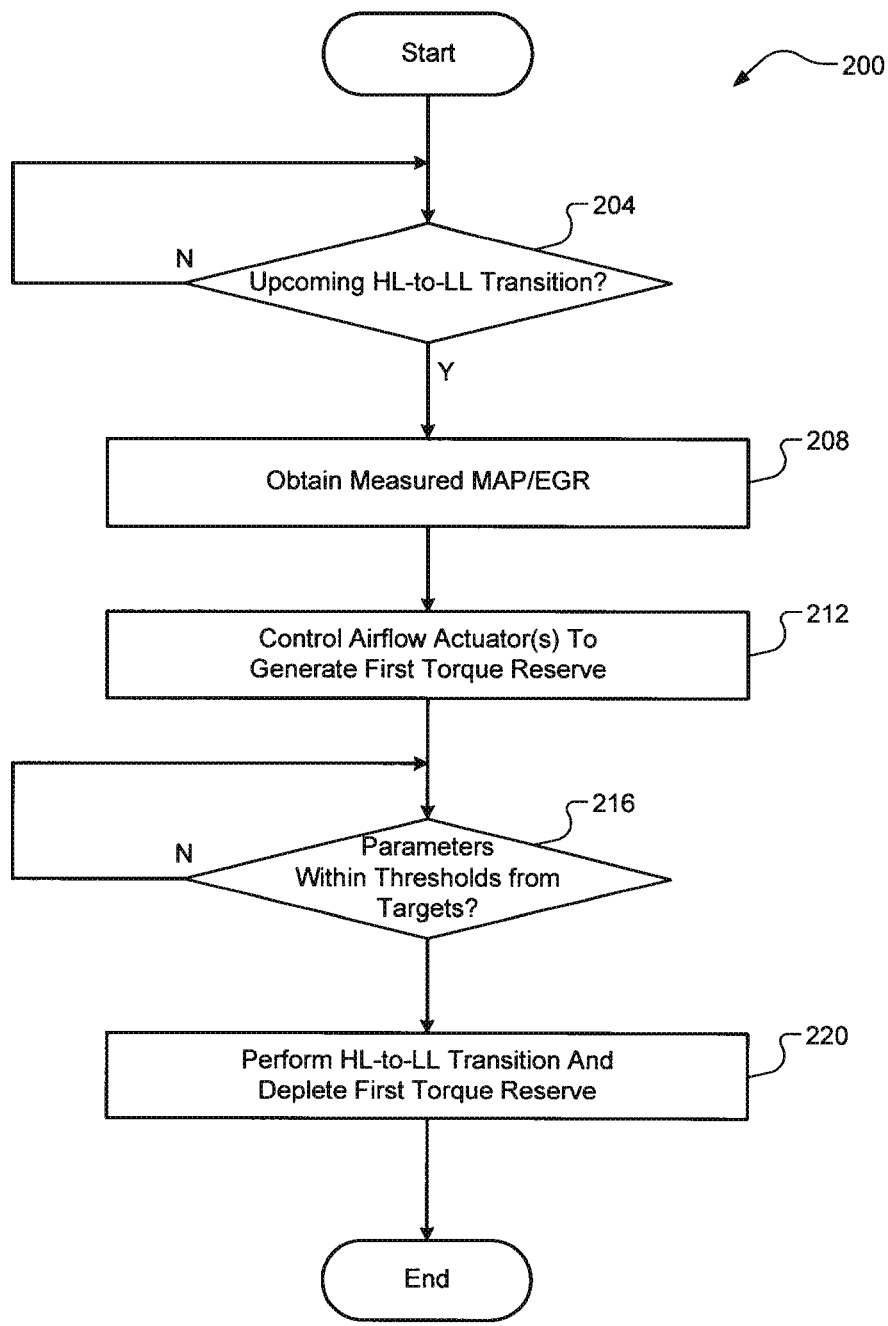
FIG. 2 is a flow diagram of an example two-step valvetrain preposition control strategy according to the principles of the present disclosure.
Figure 3:
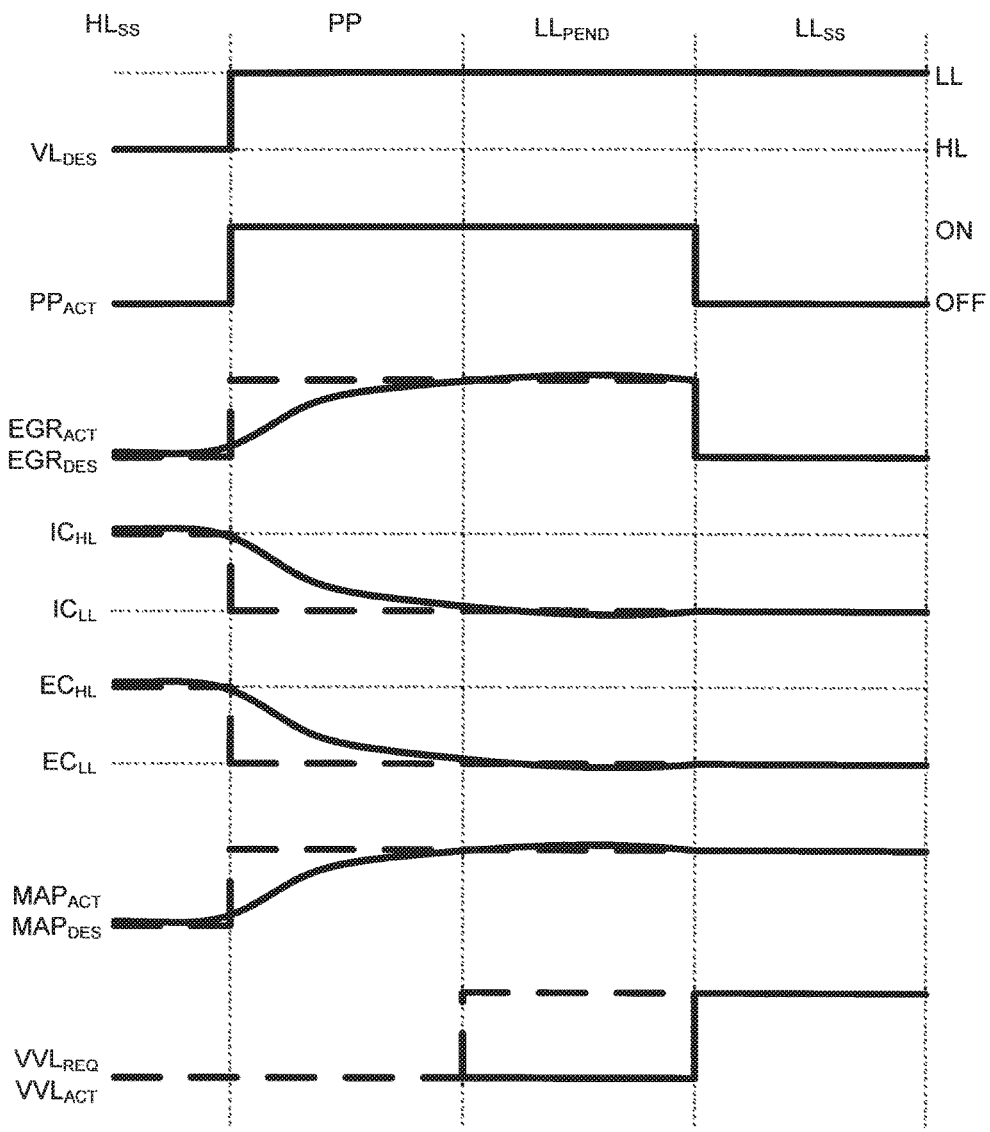
FIG. 3 is a timing diagram of the example two-step valvetrain preposition control strategy of FIG. 2.

Referring now to FIG. 2, an example flow diagram of an example two-step valvetrain preposition control strategy 200 is illustrated. Reference will also be made to FIG. 3, which illustrates an example timing diagram for the preposition control strategy 200. At 204, the controller 156 detects whether a valve lift state change is anticipated or upcoming. For example, this determination could be made based on current and/or anticipated engine load. In FIG. 3, the system is operating under steady state in the high lift mode ($HL_{SS}$) when an upcoming valve lift state change is detected (represented by the desired valve lift signal $VL_{DES}$). When the upcoming valve lift state change is detected, the controller 148 begins a preposition control routine (e.g., a preposition active signal $PP_{ACT}$ changes) at 208-216. At 208, the controller 148 obtains a measured MAP and a measured EGR mass fraction.

At 212 the controller 148, based on the measured MAP and EGR mass fraction, controls a set of airflow actuators of the engine 104 to generate a first torque reserve. In some implementations, the set of airflow actuators includes the throttle valve 115, the EGR valve 152, the intake camshaft phasers 130, and the exhaust camshaft phases (not shown). In FIG. 3, the following transitions are illustrated: (i) the actual MAP ($MAP_{ACT}$) versus the desired MAP ($MAP_{DES}$), (ii) the actual EGR mass fraction ($EGR_{ACT}$) versus the desired EGR mass fraction ($EGR_{DES}$), (iii) the current intake camshaft phaser position ($IC_{HL}$) versus the new intake camshaft phaser position ($IC_{LL}$), and (iv) the current exhaust camshaft phaser position ($EC_{HL}$) versus the new exhaust camshaft phaser position ($EC_{LL}$).

At 216, the controller 148 determines whether each of these parameters (i.e., their actual value) is within a respective threshold from their target or desired value. If true, the technique 200 proceeds to 220. If false, the technique 200 waits at 216. In one exemplary implementation, another precondition could be the oil pressure in the DSOP being at an appropriate level to perform the valve lift state change. At 220, the controller 148 commands the VVL system 124 (e.g., solenoid actuators) such that the valve lift state change is performed. This is illustrated in FIG. 3 by the delayed actuation signal ($VVL_{ACT}$) compared to the VVL change request ($VVL_{REQ}$). During this valve lift state change, the controller 148 depletes the first torque reserve, thereby providing a smooth torque response across the valve lift state change. The technique 200 then ends or returns to 200 for one or more additional cycles.

Further, while the technique 200 in FIGS. 2-3 is illustrated for a HL-to-LL transition, it will be appreciated that the techniques of the present disclosure could be similarly applied for an anticipated or upcoming LL-to-HL transition. In such scenarios, the preposition control strategy could be executed faster because the slower airflow actuators are not required to generate the torque reserve. That is, faster actuators (e.g., spark retardation) could be utilized to generate a second torque reserve that could be depleted during the LL-to-HL transition. More specifically, in response to detecting the upcoming LL-to-HL transition, the controller 148 could control the ignition system 126 to retard spark timing to generate the second torque reserve, which could then be depleted during the LL-to-HL transition, thereby providing for a similarly smooth torque across the LL-to-HL transition.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an engine having a two-step variable valve lift (VVL) system, the control system comprising:
a manifold absolute pressure (MAP) sensor configured to measure a pressure in an intake manifold of the engine;
an exhaust gas recirculation (EGR) valve position sensor configured to measure a position of an EGR valve of the engine; and
a controller configured to detect an upcoming high lift to low lift (HL-to-LL) valve state transition and, in response to detecting the upcoming HL-to-LL valve state transition:
based on the intake manifold pressure and the EGR valve position, control a set of airflow actuators of the engine to generate a first torque reserve, and
in response to generating the first torque reserve, (i) command the HL-to-LL transition and (ii) deplete the first torque reserve during the HL-to-LL transition to mitigate torque disturbance associated with the HL-to-LL transition.

2. The control system of claim 1, wherein the set of airflow actuators include a throttle valve of the engine and the EGR valve.

3. The control system of claim 2, wherein the set of airflow actuators further includes intake and exhaust camshaft phasers.

4. The control system of claim 1, wherein depleting the torque reserve during the HL-to-LL valve state transition includes (i) commanding fuel and spark systems to low lift modes and (ii) actuating solenoids of the VVL system to low lift.

5. The control system of claim 1, wherein detecting the HL-to-LL transition further comprises determining that dual-stage oil pump (DSOP) pressure is appropriate for performing the HL-to-LL valve state transition.

6. The control system of claim 1, wherein the controller is configured to detect the upcoming HL-to-LL valve state transition based on a calculated volumetric efficiency (VE) of the engine.

7. The control system of claim 1, wherein the controller is further configured to detect an upcoming low lift to high lift (LL-to-HL) valve state transition and, in response to detecting the LL-to-HL valve state transition, control a set of ignition actuators to generate a second torque reserve.

8. The control system of claim 7, wherein the controller is further configured to, in response to generating the second torque reserve, (i) command the LL-to-HL transition and (ii) deplete the second torque reserve during the LL-to-HL transition.

9. The control system of claim 8, wherein controlling the set of ignition actuators to generate the second torque reserve includes retarding spark timing.

10. A method of controlling an engine having a two-step variable valve lift system, the method comprising:
receiving, by a controller and from a manifold absolute pressure (MAP) sensor, a pressure in an intake manifold of the engine;
receiving, by the controller and from an exhaust gas recirculation (EGR) sensor, a position of an EGR valve of the engine; and
detecting, by the controller, an upcoming high lift to low lift (HL-to-LL) valve state transition and, in response to detecting the upcoming HL-to-LL valve state transition:
based on the intake manifold pressure and the EGR valve position, controlling, by the controller, a set of airflow actuators of the engine to generate a first torque reserve, and
in response to generating the first torque reserve, (i) commanding, by the controller, the HL-to-LL transition and (ii) depleting, by the controller, the first torque reserve during the HL-to-LL transition to mitigate torque disturbance associated with the HL-to-LL transition.

11. The method of claim 10, wherein the set of airflow actuators includes a throttle valve of the engine and the EGR valve.

12. The method of claim 11, wherein the set of airflow actuators further includes intake and exhaust camshaft phasers.

13. The method of claim 10, wherein depleting the torque reserve during the HL-to-LL valve state transition includes (i) commanding, by the controller, fuel and spark systems to low lift modes and (ii) actuating, by the controller, solenoids of the VVL system to low lift.

14. The method of claim 10, wherein detecting the HL-to-LL transition further comprises determining, by the controller, that dual-stage oil pump (DSOP) pressure is appropriate for performing the HL-to-LL valve state transition.

15. The method of claim 10, wherein detecting the upcoming HL-to-LL valve state transition is based on a calculated volumetric efficiency (VE) of the engine.

16. The method of claim 10, further comprising:
detecting, by the controller, an upcoming low lift to high lift (LL-to-HL) valve state transition; and
in response to detecting the LL-to-HL valve state transition, controlling, by the controller, a set of ignition actuators to generate a second torque reserve.

17. The method of claim 16, further comprising in response to generating the second torque reserve, (i) commanding, by the controller, the LL-to-HL transition and (ii) depleting, by the controller, the second torque reserve during the LL-to-HL transition.

18. The method of claim 17, wherein controlling the set of ignition actuators to generate the second torque reserve includes retarding spark timing.

* * * * *